(12) United States Patent
Berenbaum et al.

(10) Patent No.: US 7,979,601 B2
(45) Date of Patent: Jul. 12, 2011

(54) EXTERNAL DIRECT MEMORY ACCESS OF EMBEDDED CONTROLLER MEMORY

(75) Inventors: Alan D. Berenbaum, New York, NY (US); Eileen M. Marando, Bellmore, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 345 days.

(21) Appl. No.: 12/186,373

(22) Filed: Aug. 5, 2008

(65) Prior Publication Data
US 2010/0036979 A1    Feb. 11, 2010

(51) Int. Cl.
G06F 13/28 (2006.01)
G06F 13/30 (2006.01)
G06F 13/42 (2006.01)

(52) U.S. Cl. .............. 710/22; 710/26; 710/108
(58) Field of Classification Search .......... 710/22, 710/108
See application file for complete search history.

(56) References Cited

U.S. PATENT DOCUMENTS

| | | |
|---|---|---|
| 5,426,769 A | 6/1995 | Pawloski |
| 5,748,945 A | 5/1998 | Ng |
| 5,826,105 A | 10/1998 | Burstein et al. |
| 5,907,862 A | 5/1999 | Smalley |
| 5,987,557 A | 11/1999 | Ebrahim |
| 6,247,084 B1 * | 6/2001 | Apostol et al. ............... 710/108 |
| 6,260,081 B1 | 7/2001 | Magro et al. |
| 6,330,626 B1 | 12/2001 | Dennin et al. |
| 6,499,098 B1 * | 12/2002 | Laurenti ................... 712/209 |
| 6,959,428 B2 | 10/2005 | Broberg, III et al. |
| 7,003,638 B2 | 2/2006 | Brant et al. |
| 7,076,708 B2 | 7/2006 | Faust et al. |
| 7,130,942 B2 | 10/2006 | Gemelli et al. |
| 2005/0223136 A1 * | 10/2005 | Tanaka et al. ................ 710/22 |
| 2006/0224818 A1 | 10/2006 | Stewart |

OTHER PUBLICATIONS

U. S. Appl. No. 11/848,808, entitled "Memory Protection for Embedded Controllers", by Berenbaum, et al., filed Aug. 31, 2007.

* cited by examiner

Primary Examiner — Henry W Tsai
Assistant Examiner — Hyun Nam
(74) Attorney, Agent, or Firm — Meyertons Hood Kivlin Kowert & Goetzel, P.C.; Jeffrey C. Hood; Joel L. Stevens

(57) ABSTRACT

An embedded controller capable of providing direct memory access (DMA) to memory for a host. The controller may include a processor, a memory medium, and an interface coupled to the memory medium. The interface may be configured to couple to a host and receive a DMA request. The DMA request may include a request to read data from a memory location in the memory medium or a request to write data to a memory location in the memory medium. The DMA request may include a relative memory address. The interface may be configured to translate the relative memory address into a first address of the memory medium. Accordingly, the interface may perform operations according to the DMA request using the first address of the memory medium. The processor may be configured to operate according to data stored in the memory medium.

21 Claims, 4 Drawing Sheets

EXTERNAL DIRECT MEMORY ACCESS OF EMBEDDED CONTROLLER MEMORY

FIELD OF THE INVENTION

The present invention relates to the field of embedded controllers, and more particularly to a system and method for performing direct memory access (DMA) from an external device to an embedded controller memory.

DESCRIPTION OF THE RELATED ART

In recent years, the use of electronic devices has proliferated. For example, it is commonplace for users to own a variety of electronic devices, including, for example, cell phones, personal digital assistants, portable media players, as well as computer peripheral devices such as keyboards, mice, external hard drives, monitors, etc. Such electronic devices typically include embedded systems and embedded controllers. When coupled to a host device, such as a computer, the host and electronic device communicate, e.g., to transmit status and configuration information, to exchange messages, and/or to initialize program memory or data memory in the embedded controller.

Typically, this problem has been addressed by using one or more "mailbox" registers, in which either the embedded controller or the host may leave a short message for the other. In the case where the host wishes to read blocks of memory, the host may send a sequence of short messages to the embedded controller requesting the contents of each memory location, and then the host must wait until the embedded controller in turn sends a message back with the result. However, this method is typically slow and requires a large amount of processing load or wait time on the host (e.g., for repeatedly polling the embedded controller to check for a response or receiving an interrupt from the embedded controller) as well as load on the Embedded Controller. Thus, improvements in communication between embedded controllers and hosts are desired.

SUMMARY OF THE INVENTION

Various embodiments of a system and method for performing direct memory access (DMA) of embedded controller memory.

The embedded controller may include a processor and a memory medium coupled to the processor. The embedded controller may further include an interface coupled to the memory medium.

The interface may be configured to couple to a host and receive a direct memory access (DMA) request from the host. The DMA request may include a request to read data from a memory location in the memory medium or a request to write data to a memory location in the memory medium. The DMA request may include a relative memory address.

The interface may be configured to translate the relative memory address into a first address of the memory medium. The interface may be configured to translate relative memory addresses into addresses of a plurality of discontinuous regions of the memory medium. In some embodiments, each of the regions may have different levels or types of access for the host, e.g., read only, write only, read and write, etc. For example, the interface may be configured to provide read only access to a first region of the memory medium and read and write access to a second region of the memory medium. Furthermore, each region may be further subdivided, e.g., into blocks or portions of read only access, write only access, and/or read and write access.

Thus, the interface may be configured to translate the relative memory address of the DMA request into a specific region (or portion of a region) of the plurality of discontinuous regions in the memory medium. Additionally, the specific region (or portion) may be a read only region, a write only region, or a read and write region.

Note that the interface may be configured to provide memory protection of the memory medium in translating the relative memory address to the first address. The memory protection may be a base limit memory protection, page memory protection, and/or other types of memory protection.

Accordingly, the interface may perform operations according to the DMA request using the first address of the memory medium.

The processor may be configured to operate according to data stored in the memory medium.

The interface may be configured to receive a second DMA request from the host. However, the second DMA request may not include a relative memory address. The interface may be configured to perform operations according to the second DMA request using an automatically determined address of the memory medium. In one embodiment, the interface may automatically increment the first address of the memory medium to determine the address of the memory medium. Alternatively, or additionally, the interface may be configured to automatically increment the relative memory address to determine address of the memory medium. Accordingly, the interface may perform operations according to the second DMA request using the automatically determined address of the memory medium.

BRIEF DESCRIPTION OF THE DRAWINGS

A better understanding of the present invention can be obtained when the following detailed description of the preferred embodiment is considered in conjunction with the following drawings, in which.

Figure 1:
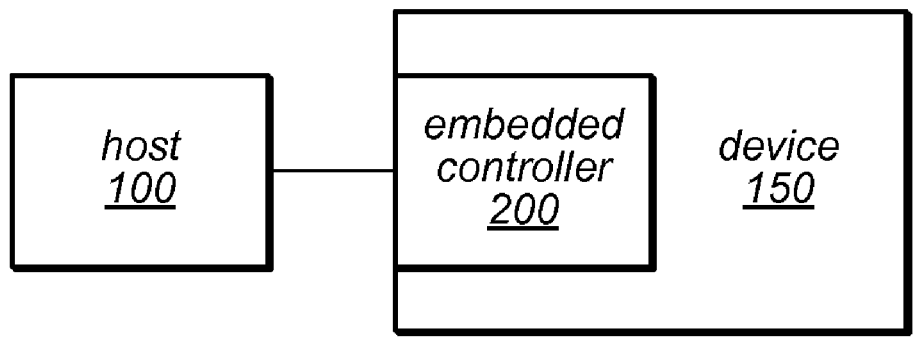
FIG. 1 illustrates a host system coupled to a device according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary Host and Device

As shown in FIG. 1, a host 100 may be coupled to device 150. Device 150 may include an embedded controller 200 which may provide an interface between the host 100 and the device 150 and may provide direct memory access (DMA) for the host to memory of the device 150.

The host may be a computer system, which may include a display device, various input devices, and other peripheral devices. The computer system may include at least one memory medium on which one or more computer programs or software components may be stored as well as a processor, which may execute program instructions stored in the memory medium. The memory medium may also store operating system software, as well as other software for operation of the computer system. Various embodiments further include receiving or storing instructions and/or data implemented in accordance with the foregoing description upon a carrier medium.

The device 150 may be any of various devices that may couple to the host 100. For example, the device 150 may be an input device, such as a keyboard, mouse, touch screen, microphone, etc. Alternatively, or additionally, the device 150 may be a portable device that is configured to communicate with the host 100, e.g., using methods described herein. In one embodiment, the portable device may be a cell phone, smart phone, personal digital assistant, portable media player, laptop, tablet, digital camera, and/or other devices. Thus, FIG. 1 illustrates an exemplary host coupled to a device with an embedded controller.

Figure 2:
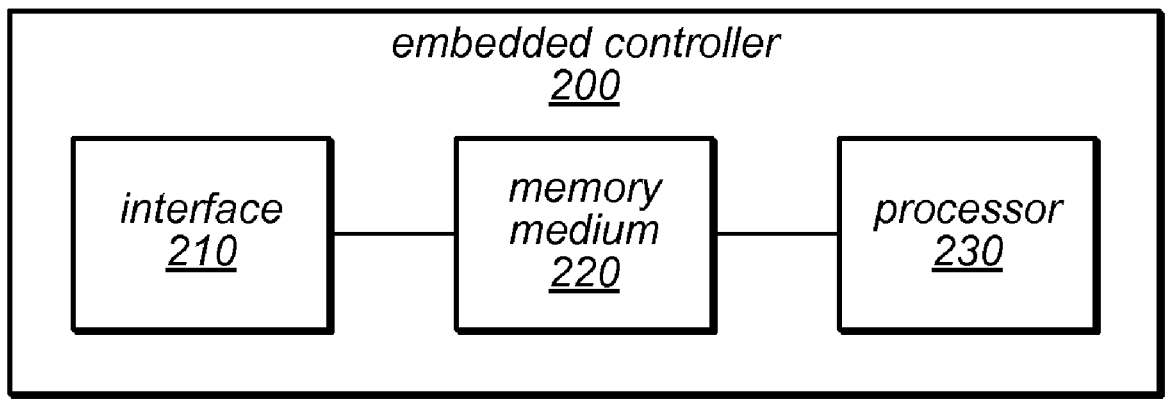
FIG. 2 illustrates a system diagram of an embedded controller of the device, according to one embodiment.

FIG. 2—Exemplary Embedded Controller

FIG. 2 illustrates an exemplary system diagram of the embedded controller 200 shown in FIG. 1. As shown, the embedded controller 200 may include an interface 210 for providing direct memory access for the host 100 to a memory medium 220 of the embedded controller 200. In one embodiment, the interface 210 may occupy a small range of addresses in the host's (100) address space and may directly map data from this small range in the host's (100) space into a slice or portion of the embedded controller's memory.

The embedded controller may also include a processor (e.g., an embedded processor) 230, which may operate according to instructions stored in the memory medium 220. For example, the processor 230 may execute program instructions (e.g., computer software) stored on the memory medium 220. Alternatively, or additionally, the memory medium 220 may store configuration information or settings related to execution of various software, according to which the processor 230 may operate and/or execute the software.

Note that the above included components of the embedded controller 200 are exemplary only and that other configurations, components, and/or connections are envisioned.

Figure 3:
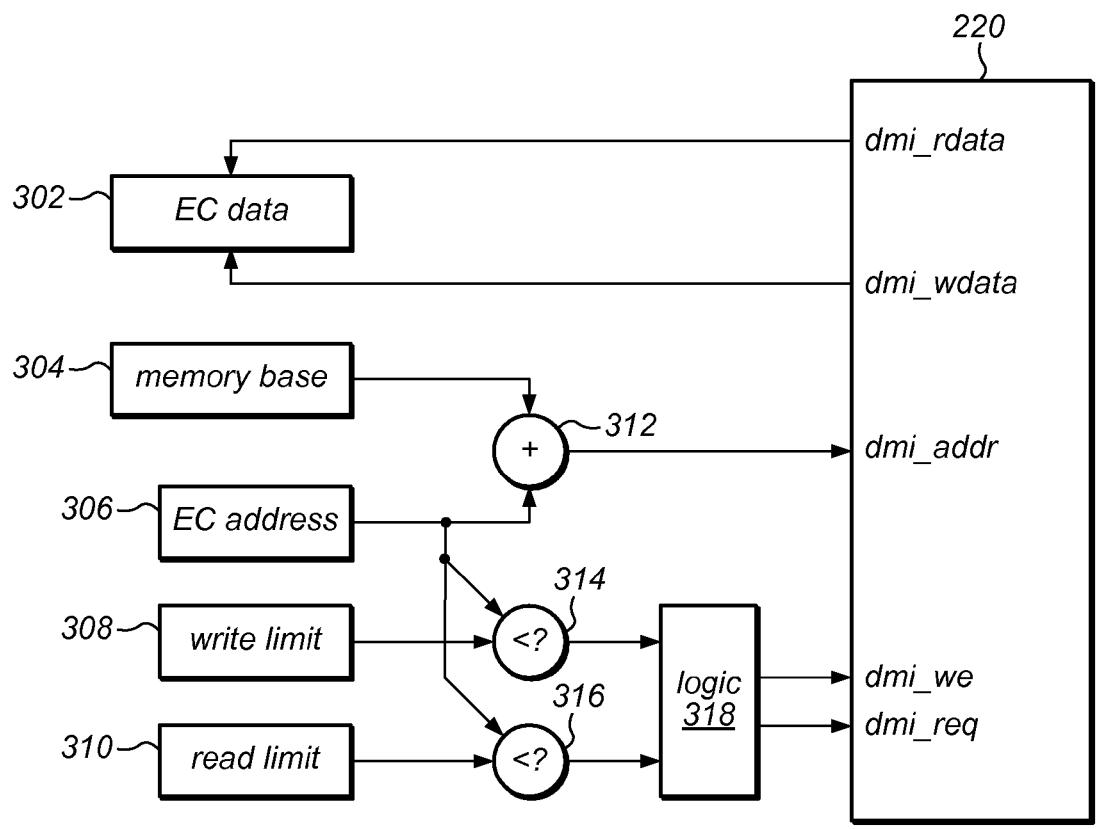
FIGS. 3 and 4 are block diagrams of a memory interface of the embedded controller, according to one embodiment.
Figure 4:
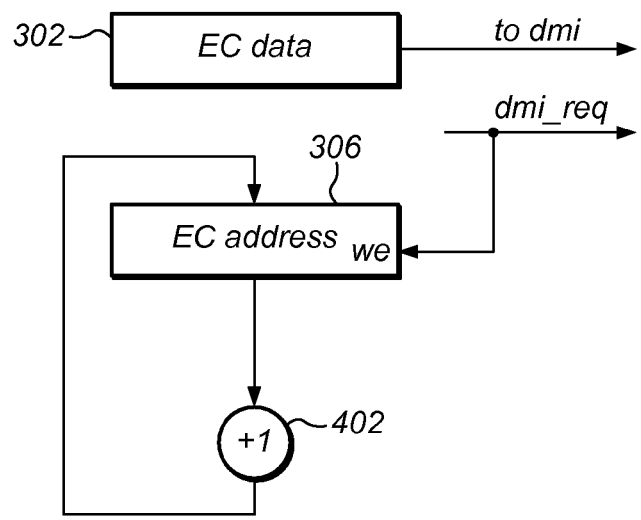

FIGS. 3 and 4—Exemplary Embedded Controller Interface

FIG. 3 illustrates an exemplary system diagram of the embedded controller interface 210 coupled to the memory medium 220. "dmi" refers to a direct memory interface for the memory. The EC Address register 306 is the address register visible to the host 100. The host 100 may provide a relative memory address to the EC address register 306 in a DMA request. In one embodiment, the relative memory address may simply be an offset value, e.g., of an allocated memory space provided by the embedded controller 200.

The memory base register 304 may provide a memory map that translates the relative address written by the host 100 into EC Address 306 into an address in the memory medium 220 (that is, into the embedded controller address space) using logic in 312. The write limit and read limit registers (308 and 310, respectively) provide access control, which may restrict the range of addresses that the host can access. The memory base 304, the write limit 308, and the read limit 310 may be accessible only by the embedded controller 200, so that the host 100 cannot change the address map.

If the EC address 306 is to be mapped into more than one region (e.g., to a plurality of discontinuous regions), one or more bits in the EC address register 306 can be used to multiple sets of Memory Base/Write Limit/Read Limit registers, with the selected result muxed into the dmi_addr using logic 318. For example, the EC address 306 can be interpreted as an offset into a single region of memory, or the contents of the EC address 306 can be interpreted as segmented, in that a portion of the address may be used to select among a number of regions and the remainder of the address may be used as an offset within the selected region. Various port names on the memory include:

addr: the address in the memory of the data that is of interest rdata: read data port. Data in the memory at the address referenced by addr appear on this port.

wdata: write data port. Data to be written into the memory at addr is placed on this port.

req: data request. When this signal is asserted, data located at addr is copied to rdata, or data at wdata is written into the memory we: write enable. When this signal is asserted along with req, the action of the request is to write into the memory. When this signal is not asserted, the action is a read FIG. 4 provides a simple illustration of an auto-increment mechanism that may be used according to one embodiment. Whenever the memory medium 220 is accessed (e.g., when the dmi_req signal is asserted, starting either a read or write), the EC Address register 306 may be updated with the next sequential address, according to the incrementor 402. Note that other methods for determining the next sequential address are envisioned, including memory maps, decrementors, etc.

Thus, FIGS. 3 and 4 provide exemplary system diagrams of the embedded controller interface 210. The above described Figures are exemplary only and other variations, configurations, components, etc. are envisioned.

Figure 5:
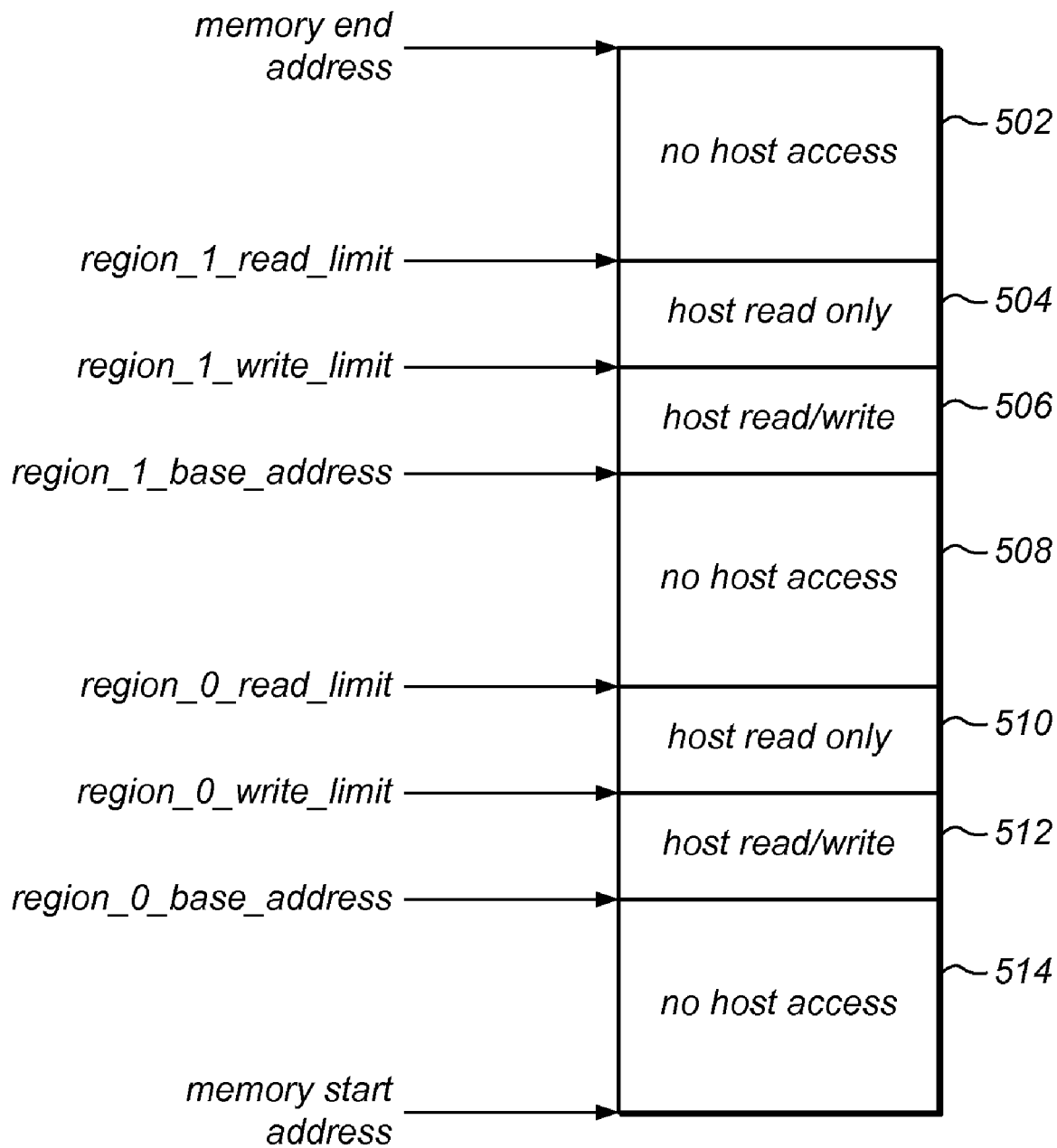
FIG. 5 is a block diagram of a memory medium of the embedded controller, according to one embodiment.

FIG. 5—Exemplary Embedded Controller Memory

As shown in FIG. 5, there are two discontinuous regions of the memory medium 220 that are allocated for host access. In this example, those regions are each defined according to base limit memory protection and each include two portions. More specifically, the two portions 504 and 506 (defined by region_1_base_address, region_1_write_limit, and region_1_read_limit) make up a region 1. As shown, portion 504 is provided to the host by the interface for read only access whereas the host may read and write in portion 506 (as allowed and determined by the interface 210). Similarly, region 0 includes portion 510 (host read only) and portion 512 (host read/write), and is defined by region_0_base_address, region_0_write_limit, and region_0_read_limit. The memory medium ranges from a memory start address (e.g., 80_0000h) to a memory end address (e.g., 80_xxxxh). Memory portions 502, 508, and 514 are protected from host access by the interface 210. Thus, by moving the Read and Write limit pointers, the embedded controller 200 (e.g., in the interface 210) can restrict host access. For example, if the Region_i_Write_Limit register is set to the same address as the Region_i_Base_Address register, the mapped region is read-only. If the Region_i_Read_Limit register and the Region_i_Write_Limit registers are set to the same value, then the mapped region is fully read/write.

However, it should be noted that further configurations and variations are envisioned. For example, each region could be divided into more than one portion, or may include a single portion. The regions and/or portions may be any of read and write host access, read only host access, and write only host access. Alternatively, the memory medium 220 may be divided or protected using other memory schemes. For example, the memory medium 220 may be paged and a memory map may be used to assign host access for particular blocks or portions of the paged memory. For example, any particular block of memory may be read only, read and write, or write only (e.g., for host access). In such embodiments, the interface 210 described above can be modified to accommodate paged memory protection schemes. However, it should be noted that other memory protection or division methods are envisioned.

Figure 6:
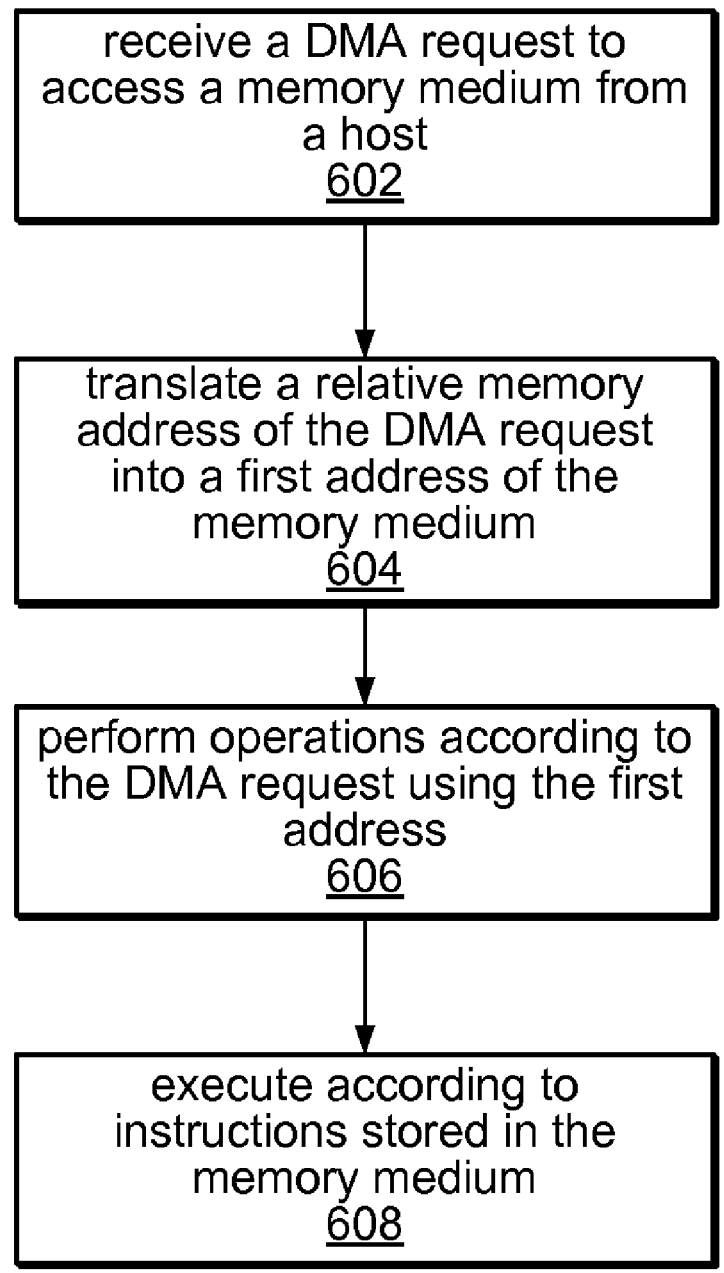
FIG. 6 is a flowchart diagram illustrating one embodiment of a method for performing direct memory access on an embedded controller, according to one embodiment.

FIG. 6—Exemplary Method for Performing DMA of an Embedded Controller

FIG. 6 illustrates a method for performing direct memory access (DMA) of embedded controller memory. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, a DMA request may be received from a host, e.g., by an embedded controller or more specifically, an interface of the embedded controller. The DMA request may include a request to read data from a memory location in a memory medium or a request to write data to a memory location in the memory medium. The DMA request may include a relative memory address. In some embodiments, the relative memory address may be an offset of an allocated space of memory. For example, the embedded controller may allocate a space of memory (which may be composed of a single region, a plurality of discontinuous regions, a plurality of blocks, etc.) for the host. The embedded controller may provide a total amount of space to the host (e.g., 1024 bytes) and possibly other information (e.g., which potions are read only, write only, read and write, etc.). Correspondingly, the host may provide as a relative address, following the example, an offset of the 1024 bytes. For example, to write at byte 8 of the 1024 bytes, the host may provide a relative memory address of 8.

Where the DMA request is a request to write data to a memory location in the memory medium, the DMA request may further include a first portion of data. In some embodiments, the first portion of data may be stored in a data register of the embedded controller and the relative memory address may be stored in an address register of the embedded controller. Thus, the interface of the embedded controller may provide a portal for the host to perform direct memory access of a memory medium of the embedded controller.

The host may send the DMA request for a variety of reasons. As indicated above, the DMA request may be to write data into the memory medium of the embedded controller. For example, in one embodiment, the data may be configuration data (to modify or initialize various settings of operation of the embedded controller, e.g., communication configurations, operational settings, etc.). As another example, the data may be software program(s) (e.g., for execution by the embedded processor) or updated information or replacement data for currently executing software programs on the embedded controller. Alternatively, or additionally, the data may be communication messages sent from the host to the embedded controller. In some embodiments, the data may be data files, e.g., media files, possibly for a portable media player or phone.

Alternatively, the DMA request may be to read data from a location of the memory medium of the embedded controller. Thus, the relative address may be a position of the allocated memory space which the host wishes to read. That particular address may store data related to configuration, data files stored on a device comprising the embedded controller, software programs, etc.

In 604, the relative memory address may be translated into a first address of the memory medium, e.g., using a memory map. The relative memory address may be translated by the embedded controller, e.g., the interface of the embedded controller. In some embodiments, translating the relative memory address may include selecting a first region from a plurality of discontinuous regions of the memory medium. For example, the allocated memory space for the host may actually comprise the plurality of discontinuous regions of the memory medium. Thus, translating the relative address may include determining the appropriate region of the discontinuous regions, e.g., using a memory map.

In some embodiments, the plurality of regions may be of various types. For example, a first region of the plurality of regions may be a read only region (e.g., read only with respect to host access). Thus, in that particular region of the memory medium, the host may only read data. Similarly, regions may be write only, read and write, etc.

In some embodiments, each region of memory may be divided into blocks or portions. Each block or portion may be read only, write only, and read and write with respect to host access. Each region may only have a single portion, two portions, or more than two portions, as desired. As one example, the regions may be divided according to base limit schemes, page schemes, memory maps, etc. Thus, translating the relative memory address may include determining or selecting a first region or portion of the memory medium, and the first region or portion may be read only, write only, or read and write with respect to host access. Finally, the translation may include determining a specific memory address, e.g., using a memory map, of a particular region or portion.

Note that the embedded controller (e.g., the interface) may deny access or reads or writes where the translated memory address and the DMA request do not match. For example, where the DMA request attempts to write data to a read only region (or portion of the region), the data may not be written, and the DMA request may be denied. Similar results may occur with other incompatible requests and regions (e.g., reading from write only memory).

In 606, operations may be performed according to the DMA request using the first address of the memory medium. The operations may be performed by the embedded controller (e.g., the interface and/or the processor of the embedded controller). More particularly, the operations may include writing data to a particular area of the memory medium (e.g., where the DMA request is a write request). The data may be written from the data register described above. Alternatively, the operations may include reading data from a particular area of the memory medium (e.g., the area referenced by the first address). The data may be read from the memory medium and stored in the data register described above, and the host may retrieve the data from that data register.

In 608, instructions may be executed (e.g., by the processor of the embedded controller) according to instructions stored in the memory medium. More specifically, the processor may execute normally using instructions stored in the memory medium. Thus, where the DMA request results in updating or changing of data in the memory medium (e.g., configuration data, program instructions, software, etc.) the processor may execute according to those instructions. For example, where the data written as a result of the DMA request includes software, the software may be executed by the processor. As another example, where the data written as a result of the DMA request includes configuration updates (e.g., communication configuration updates), the processor may execute or communicate according to the new configuration (or cause other hardware/software to communicate according to the new configuration).

The method may further include receiving a second DMA request from the host. In some embodiments, the second DMA request may not include a relative memory address. Instead, the method may include automatically determining a new address of the memory medium. For example, the new address may be determined by automatically incrementing the first address of the memory medium of 604. Alternatively, or additionally, the new address may be determined by automatically incrementing the relative address received in the DMA request of 602, incrementing that address, and determining the new address from the incremented address. As another example, the new address may be determined using memory maps and/or other techniques.

Automatically determining the new address may allow the host to read or write a block of memory in the embedded controller address space with a sequence of reads or writes to the data register, thereby cutting the bandwidth requirement for host access in half (since the host does not have to update the address register). However, it should be noted that the second DMA request may simply include a new relative address, and the method described above (604-608) may be repeated.

Accordingly, operations may be performed according to the second DMA request, and similar to 608 above, instructions may be executed according to instructions stored in the memory medium.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An embedded controller, comprising:
   a processor;
   a memory medium coupled to the processor; and
   an interface coupled to the memory medium, wherein the interface is configured to:
   couple to a host;
   receive a direct memory access (DMA) request from the host, wherein the DMA request comprises a request to read data from a memory location in the memory medium or a request to write data to a memory location in the memory medium, and wherein the DMA request comprises a relative memory address;
   translate the relative memory address into a first address of the memory medium;
   perform operations according to the DMA request using the first address of the memory medium;
   receive a second DMA request from the host, wherein the second DMA request does not comprise a relative memory address;
   automatically increment the first address of the memory medium or automatically increment the relative memory address, wherein said automatically incrementing is performed in response to receiving the second DMA request
   perform operations according to the second DMA request using the automatically determined address of the memory medium;
   wherein the processor is configured to operate according to data stored in the memory medium.

2. The embedded controller of claim 1, wherein the interface is configured to translate relative memory addresses into addresses of a plurality of discontinuous regions of the memory medium.

3. The embedded controller of claim 2, wherein the interface is configured to provide read only access to a first region of the memory medium and read and write access to a second region of the memory medium.

4. The embedded controller of claim 2, wherein the interface is configured to provide read only access to a first portion of a first region of the memory medium and read and write access to a second portion of the first region.

5. The embedded controller of claim 1, wherein the interface is configured to provide memory protection of the memory medium in translating the relative memory address to the first address of the memory medium.

6. The embedded controller of claim 4, wherein said providing memory protection comprises using base limit memory protection.

7. A method for processing a direct memory access (DMA) request, comprising:
   receiving a DMA request from a host, wherein the DMA request comprises a request to read data from a memory location in a memory medium or a request to write data to a memory location in the memory medium, and wherein the DMA request comprises a relative memory address;
   translating the relative memory address into a first address of the memory medium;
   performing operations according to the DMA request using the first address of the memory medium;
   receiving a second DMA request from the host, wherein the second DMA request does not comprise a relative memory address;
   automatically incrementing the first address of the memory medium or the relative memory address, wherein said automatically incrementing is performed in response to receiving the second DMA request performing operations according to the second DMA request using the automatically incremented address of the memory medium.

8. The method of claim 7, wherein said receiving, said translating, and said performing is performed by an embedded controller.

9. The method of claim 7, wherein said translating comprises:

selecting a first region from a plurality of discontinuous regions of the memory medium.

10. The method of claim 9, wherein the first region is a read only region of the memory medium, relative to the DMA request.

11. The method of claim 9, wherein the first region is a read and write region of the memory medium, relative to the DMA request.

12. The method of claim 9, wherein the first region comprises a read only portion and a read and write portion.

13. The method of claim 9, wherein said translating comprises providing memory protection of the memory medium.

14. The method of claim 13, wherein said providing memory protection comprises using base limit memory protection.

15. An embedded controller, comprising:
a processor;
a memory medium coupled to the processor; and
an interface coupled to the memory medium, wherein the interface is configured to:
  couple to a host;
  receive a direct memory access (DMA) request from the host, wherein the DMA request comprises a request to read data from a memory location in the memory medium or a request to write data to a memory location in the memory medium, and wherein the DMA request comprises a relative memory address;
  translate the relative memory address into addresses of a plurality of discontinuous regions of the memory medium;
  provide memory protection by providing read only access to a first portion of a first region of the memory medium and read and write access to a second portion of the first region, wherein said providing memory protection comprises using base limit memory protection;
  perform operations according to the DMA request using the addresses of the plurality of discontinuous regions of the memory medium;
wherein the processor is configured to operate according to data stored in the memory medium.

16. A method for processing a direct memory access (DMA) request, comprising:
receiving a DMA request from a host, wherein the DMA request comprises a request to read data from a memory location in a memory medium or a request to write data to a memory location in the memory medium, and wherein the DMA request comprises a relative memory address;
translating the relative memory address into a first address of the memory medium, wherein said translating comprises providing memory protection of the memory medium, wherein said providing memory protection comprises using base limit memory protection;
performing operations according to the DMA request using the first address of the memory medium.

17. An embedded controller, comprising:
a processor;
a memory medium coupled to the processor; and
an interface coupled to the memory medium, wherein the interface is configured to:
  couple to a host;
  receive a direct memory access (DMA) request from the host, wherein the DMA request comprises a request to read data from a memory location in the memory medium or a request to write data to a memory location in the memory medium, and wherein the DMA request comprises a relative memory address;
  translate the relative memory address into a first address of the memory medium, wherein said translating comprises providing memory protection of the memory medium, wherein said providing memory protection comprises using base limit memory protection;
  perform operations according to the DMA request using the first address of the memory medium;
wherein the processor is configured to operate according to data stored in the memory medium.

18. An embedded controller, comprising:
a processor;
a memory medium coupled to the processor; and
an interface coupled to the memory medium, wherein the interface is configured to:
  couple to a host;
  receive a memory access (MA) request from the host, wherein the MA request comprises a request to read data from a memory location in the memory medium or a request to write data to a memory location in the memory medium, and wherein the MA request comprises a relative memory address;
  translate the relative memory address into a first address of the memory medium;
  perform operations according to the MA request using the first address of the memory medium;
  receive a second MA request from the host, wherein the second MA request does not comprise a relative memory address;
  automatically increment the first address of the memory medium or automatically increment the relative memory address, wherein said automatically incrementing is performed in response to receiving the second MA request
  perform operations according to the second MA request using the automatically determined address of the memory medium;
wherein the processor is configured to operate according to data stored in the memory medium.

19. An embedded controller, comprising:
a processor;
a memory medium coupled to the processor; and
an interface coupled to the memory medium, wherein the interface is configured to:
  couple to a host;
  receive a memory access (MA) request from the host, wherein the MA request comprises a request to read data from a memory location in the memory medium or a request to write data to a memory location in the memory medium, and wherein the MA request comprises a relative memory address;
  translate the relative memory address into addresses of a plurality of discontinuous regions of the memory medium;

provide memory protection by providing read only access to a first portion of a first region of the memory medium and read and write access to a second portion of the first region, wherein said providing memory protection comprises using base limit memory protection;

perform operations according to the MA request using the addresses of the plurality of discontinuous regions of the memory medium;

wherein the processor is configured to operate according to data stored in the memory medium.

20. A method for processing a memory access (MA) request, comprising:

receiving an MA request from a host, wherein the MA request comprises a request to read data from a memory location in a memory medium or a request to write data to a memory location in the memory medium, and wherein the MA request comprises a relative memory address;

translating the relative memory address into a first address of the memory medium;

performing operations according to the MA request using the first address of the memory medium, wherein said performing operations is not performed by the host;

receiving a second MA request from the host, wherein the second MA request does not comprise a relative memory address;

automatically incrementing the first address of the memory medium or the relative memory address, wherein said automatically incrementing is performed in response to receiving the second MA request performing operations according to the second MA request using the automatically incremented address of the memory medium, wherein said performing operations is not performed by the host.

21. A method for processing a memory access (MA) request, comprising:

receiving a MA request from a host, wherein the MA request comprises a request to read data from a memory location in a memory medium or a request to write data to a memory location in the memory medium, and wherein the MA request comprises a relative memory address;

translating the relative memory address into a first address of the memory medium, wherein said translating comprises providing memory protection of the memory medium, wherein said providing memory protection comprises using base limit memory protection;

performing operations according to the MA request using the first address of the memory medium, wherein said performing operations is not performed by the host.

* * * * *

UNITED STATES PATENT AND TRADEMARK OFFICE
CERTIFICATE OF CORRECTION

PATENT NO. : 7,979,601 B2  Page 1 of 1
APPLICATION NO. : 12/186373
DATED : July 12, 2011
INVENTOR(S) : Berenbaum et al.

It is certified that error appears in the above-identified patent and that said Letters Patent is hereby corrected as shown below:

In the Claims:

Column 9
Line 22, please delete "claim 9" and substitute -- claim 7 --.

Signed and Sealed this
Twenty-fifth Day of October, 2011

David J. Kappos
*Director of the United States Patent and Trademark Office*